J. H. HUBLER & C. E. HENDERSON.
EXPANSION BOLT.
APPLICATION FILED JUNE 18, 1912.
1,076,368.
Patented Oct. 21, 1913.
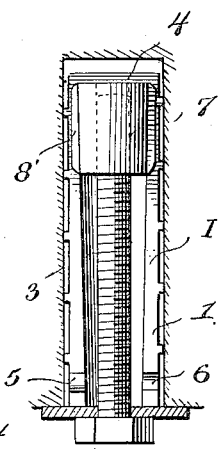
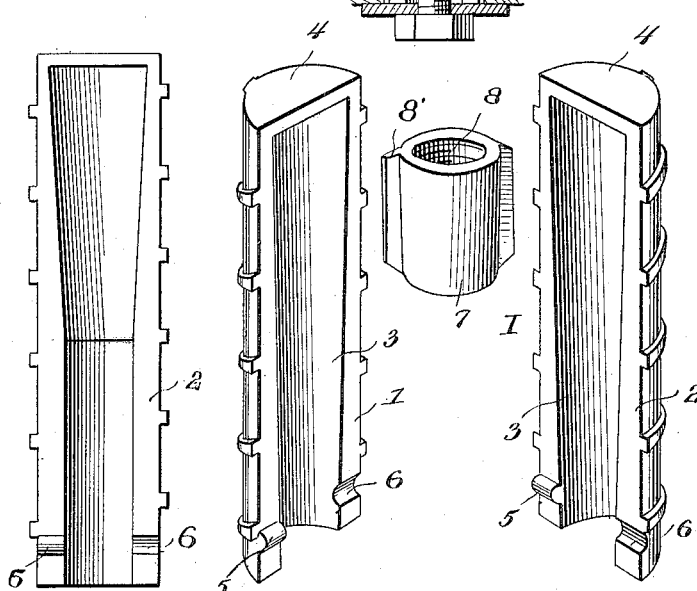
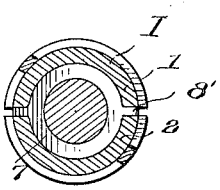
Inventors
John H. Hubler.
Clarence E. Henderson.
Witnesses
William Smith.
R. M. Smith.
By Victor J. Evans
Attorney

UNITED STATES PATENT OFFICE.

JOHN H. HUBLER AND CLARENCE E. HENDERSON, OF FREMONT, NEBRASKA.

EXPANSION-BOLT.

1,076,368.  
Specification of Letters Patent. Patented Oct. 21, 1913.

Application filed June 18, 1912. Serial No. 704,354.

*To all whom it may concern:*

Be it known that we, JOHN H. HUBLER and CLARENCE E. HENDERSON, citizens of the United States, residing at Fremont, in the county of Dodge and State of Nebraska, have invented new and useful Improvements in Expansion-Bolts, of which the following is a specification.

This invention relates to expansion bolts, the object in view being to provide an exceedingly simple, practical, and effective expansion bolt of such construction that in the operation of the bolt, the nut is caused to expand the outer shell which surrounds the nut, and in the event of such shell showing any tendency to turn within the socket or hole in which it is placed, the said shell, by its partial or entire rotation, will serve to embed and work itself farther into the hole in which it is placed.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a longitudinal section through an expansion bolt, embodying the present invention, showing said bolt in its applied position. Fig. 2 is a perspective view of the expansion bolt showing the several parts thereof separated. Fig. 3 is a cross section through the expansion bolt, including the nut element thereof. Fig. 4 is an inside face view of one of the shell sections, showing a modified form of bore.

The expansion bolt contemplated in this invention embodies a hollow or tubular shell 1, which externally is substantially cylindrical in shape, while it is provided internally with a tapering bore. The shell is divided longitudinally and diametrically into two equal sections 1 and 2, while 3 designates the tapering bore therein, which, it will be observed, is closed at the larger end by an end wall 4, the object of which is to prevent the nut from accidentally escaping at such larger end of the shell, when the shell is inserted in an opening or hole provided therefor. The sections of the shell are provided, adjacent to the smaller end of the bore, and at opposite sides thereof, with complemental keys or projections 5, and sockets or recesses 6, so as to properly position the sections of the shell with respect to each other, and maintain them in such correct relative positions, as the nut, hereinafter described, is moved lengthwise of the bore therein. The shell as a whole is also provided externally with a spiral screw thread extending continuously around the same from end to end. One, two, or more of such threads may be provided, according to the pitch it is desired to impart to said threads. These threads, as the shell is expanded, engage the inner wall of the recess or hole in which the shell is placed, and should the shell itself start to turn, said threads will serve to screw the shell farther into the hole or recess in which it is placed.

In connection with the sections of the shell, hereinabove described, we employ a substantially cylindrical but slightly tapering nut 7 provided with an internal thread 8 of any desired size or pitch, and upon its outer side said nut is provided with diametrically opposite wings 8 which lie between the meeting faces or edges of the shell sections, as clearly shown in the drawings. It will further be observed that the opposite faces of the wings 7 are made converging toward the smaller end of the nut, so that they will act with a wedging effect between the meeting faces of the shell sections, and insure the smooth sliding movement of the nut within the shell sections, while preventing any possibility of said nut turning independently of the shell. After the shell sections have been expanded in the hole by turning the bolt, the bolt may be screwed through the nut until the head thereof comes into contact with the proper abutment surface to hold the bolt securely. In case the bolt should become broken, the portion remaining in the shell may be easily and quickly removed by simply using a punch or drift against the outer end of the portion of the bolt which remains in the nut, thereby driving the nut inwardly and allowing the shell to collapse to its original size. This enables the shell and nut to be removed with ease.

In placing the expansion bolt in a vertical hole in an overhead beam or the like, a bolt may be inserted in the nut and the nut drawn toward the smaller end of the bore of the shell, so as to wedge the shell in place. This will prevent the parts of the device from falling out of place.

What is claimed is:

An expansion bolt, comprising an exteriorly cylindrical shell longitudinally and diametrically divided into equal sections and formed with a bore tapered throughout the major portion of the length thereof and left open at its smaller end, an expanding nut movable lengthwise of said bore and having its outer face tapered to conform to the taper of said bore and bearing throughout its length against the inside wall of the shell sections, and diametrically opposite wedging wings on said nut which project beyond the greatest diameter of the nut and slide between the meeting edges of the sections, said wings being wedge-shaped in longitudinal section with the inner ends toward the smaller end of the nut.

In testimony whereof we affix our signatures in presence of two witnesses.

JOHN H. HUBLER.
CLARENCE E. HENDERSON.

Witnesses:
 TOLES P. WINTERSTEEN,
 G. W. NAGEL.

Copies of this patent may be obtained for five cents each, by addressing the "Commissioner of Patents, Washington, D. C."